Nov. 9, 1965    C. A. CHRISTOFF    3,216,265

INTERMITTENT DRIVE MECHANISM

Filed Oct. 18, 1963

INVENTOR.
CHRIS A. CHRISTOFF
BY
ATTORNEY

United States Patent Office 3,216,265
Patented Nov. 9, 1965

3,216,265
INTERMITTENT DRIVE MECHANISM
Chris A. Christoff, San Gabriel, Calif., assignor to Clary Corporation, San Gabriel, Calif., a corporation of California
Filed Oct. 18, 1963, Ser. No. 317,344
4 Claims. (Cl. 74—142)

This invention relates to intermittent drive mechanisms and has particular reference to intermittent drive mechanisms of the pawl and ratchet type.

Pawl and ratchet mechanisms which require that the ratchet be driven through a precise angular increment during each advance of the pawl and which are driven by yieldable drive mechanisms, such as rotary solenoids or the like, generally require adjustable stops to limit the throw of the pawl.

Heretofore, such adjustable stops took the form of bendable ears, rotatable eccentric studs or adjustable mounts for the stops. Although such devices are generally satisfactory, they are, by the very nature of such mechanisms, subject to considerable jarring and abnormal vibration forces, especially when using a jamming arrangement for jamming the pawl radially inwardly against a ratchet tooth at the end of each pawl stroke. Such jarring tends to loosen any adjustment device. Also, although bendable ears do not incorporate screw threaded nuts or the like which might become loose, they tend to crystalize and break after repeated adjustments and after repeated jarring by the oscillating pawl. This is particularly true when such pawl and ratchet mechanisms are operated at relatively high speeds.

Therefore, a principal object of the present invention is to provide an adjustable stop means for the pawl of a pawl and ratchet mechanism which cannot get out of adjustment as a result of the repeated jarring and vibration.

Another object is to provide a precise permanent adjustment feature for controlling the throw of a pawl and ratchet mechanism.

The manner in which the above and other objects of the invention are accomplished will be readily understood on reference to the following specification when read in conjunction with the accompanying drawing, wherein.

Figure 1:
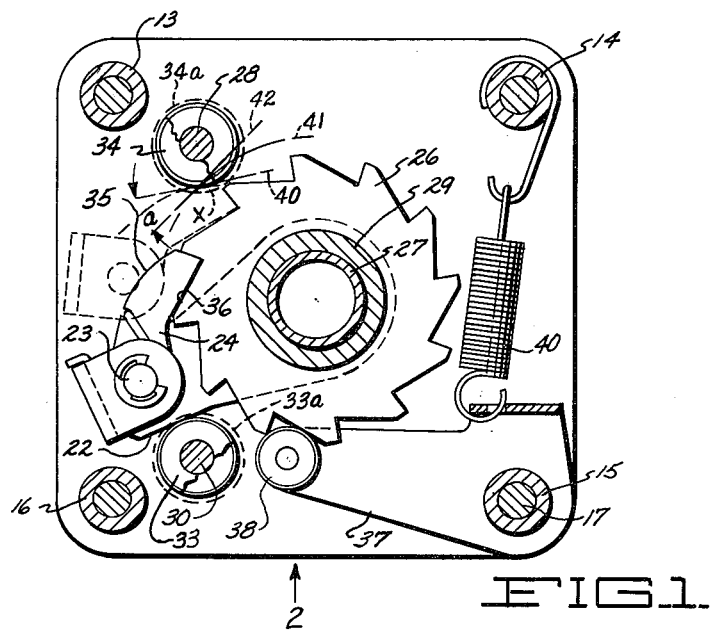
FIG. 1 is a sectional view through an intermittent drive mechanism and is taken substantially along the line 2—2 of FIG. 2.
Figure 2:
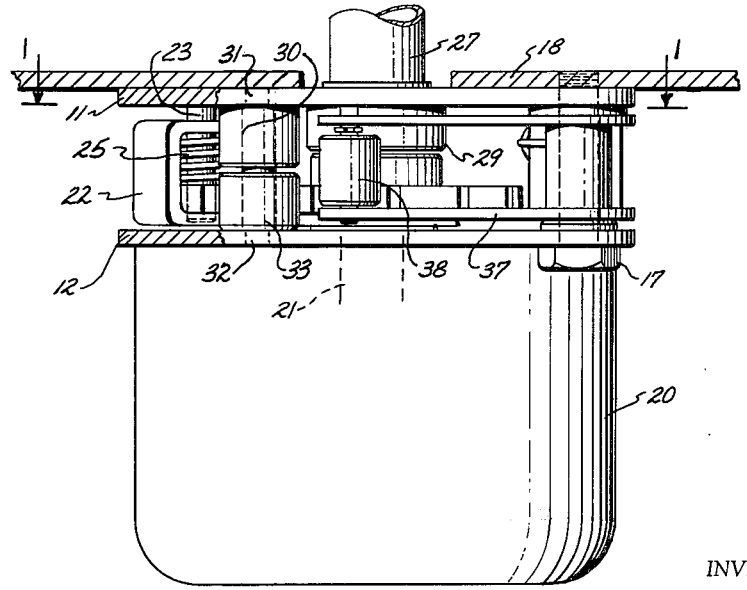
FIG. 2 is a bottom plan view, partly broken away, of the drive mechanism and is taken generally in the direction of the arrow 2 in FIG. 1.

Referring to the drawings, the drive mechanism comprises a pair of mounting plates 11 and 12 held in spaced relation to each other by four tubular spacers 13, 14, 15 and 16. Clamp bolts 17 extend through the spacers to clamp the assembly to a suitable base plate 18.

A so-called "torque" or "rotary" solenoid, generally indicated at 20, is suitably attached to the mounting plate 12. The solenoid may, for example, be of the type shown in the patent to Leland, No. 2,501,950, issued on March 28, 1950, and has an output shaft 21 to which is suitably secured an arm 22. The latter is in the form of a bail, the ends of which support a pivot rod 23 for a pawl 24. The pawl is urged clockwise by a torsion spring 25, extending between the arm and the pawl, to engage the teeth of a ratchet wheel 26. The latter is attached to a tubular shaft 27 journalled in a suitable bearing 29 carried by the mounting plate 11. The shaft 27 is coaxial with the output shaft 21.

Upon energizing the solenoid 20, the arm 22 is swung clockwise through an angle equal to the angular pitch of the teeth of the ratchet wheel which, in the present instance, is 30 degrees. Upon de-energization of the solenoid, a return spring, not shown, returns the arm and pawl to their initial positions shown in FIG. 1 wherein the pawl drops behind the next succeeding tooth on the ratchet wheel in preparation for the next advance.

Means are provided for precisely limiting the extent of throw of the pawl and for preventing overthrow of the the ratchet wheel 26 at the end of a stroke. Such means comprises a pair of studs 28 and 30, each having reduced diameter sections, i.e. 31 and 32, at opposite ends thereof, which sections are fitted in mating openings in the adjacent mounting plates 11 and 12.

A roller 33 is rotatably mounted on the stud 30 and is normally engaged by the arm 22 to locate the arm and pawl 24 in their initial positions. Likewise, the stud 28 has a roller 34 rotatably mounted thereon to limit the forward movement of the pawl.

As seen in FIG. 1, the pawl has a curved wedging surface 35 which engages the roller 34 at the end of its stroke, causing a wedging action which forces the pawl against the surface 36 of an underlying ratchet tooth to prevent overthrow of the ratchet wheel.

The curved surface 35 permits the under-surface of the pawl to slide along the surface 36 during withdrawal, without binding, and yet forms an acute wedging angle relative to the roller 34 to provide an ideal locking action against the ratchet wheel. That is, as a point X on the curved surface of the pawl contacts the roller during movement of such point along a path 41, concentric with the axis of ratchet 26, the line of tangency 40 forms an acute angle $a$ with a line 42 extending tangent to the path 41 and also passing through point X. This would not be possible if a stud or other non-rotatable element were used in lieu of roller 34 since the friction or binding forces involved would tend to prevent withdrawal of the pawl from wedged condition by the return spring of the solenoid.

In order to permit precise and fine adjustment of the throw of the pawl, a number of rollers 33 and 34 of slightly different diameters may be provided and the appropriate rollers selected to limit the throw as desired. For example, rollers of different diameters are indicated by the dotted lines 33a and 34a. Alternatively, the rollers 33 and 34 may originally be made oversize and then selectively reduced in diameter until the proper throw is obtained. In either case, the mounting plates 11 and 12 can be readily disassembled by removing the bolts 17 and the selected rollers 33 and 34 mounted on the respective studs and the parts reassembled. The resulting adjustment will be permanent and will be unaffected by the usual jarring and vibration forces developed in the mechanism.

The ratchet wheel 26 is yieldably centralized in any of its different incremental positions by a centralizer 37, pivotally supported on the spacer 15 and carrying a centralizer roller 38 engageable between the teeth of the ratchet wheel. A tension spring 40 extending between the centralizer and the spacer 14 urges the centralizer clockwise into engagement with the ratchet wheel.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In an intermittent drive mechanism having a shaft, means rotatably supporting said shaft,
a ratchet carried by said shaft, said ratchet having a plurality of teeth around the periphery thereof,
an arm movable about the axis of said ratchet,
and a pawl pivotally supported by said arm and engageable with a tooth of said ratchet whereby to drive said ratchet;
stop means for said pawl comprising studs in the paths of said pawl and said arm, respectively, for limiting movement of said pawl and said arm in each of opposite directions,
means supporting said studs in fixed position,
and a plurality of rollers of different diameters selectively and rotatably mountable on said studs for arresting said pawl,
the extent of movement of said pawl being determined by the selected ones of said rollers whereby to determine the extent of movement of said ratchet.

2. In an intermittent drive mechanism having a shaft, means rotatably supporting said shaft,
a ratchet carried by said shaft,
said ratchet having a plurality of teeth around the periphery thereof,
an arm moveable about the axis of said shaft independently of said shaft,
and a pawl pivotally supported by said arm and engageable with a tooth of said ratchet whereby to drive said ratchet;
stop means for said pawl comprising a stud,
means supporting said stud in fixed position,
and a plurality of rollers of different diameters selectively and rotatably mountable on said stud for arresting said pawl,
the extent of movement of said pawl being determined by the selected one of said rollers whereby to detemine the extent of movement of said ratchet.

3. Stop means according to claim 2 wherein said pawl engages said roller at a point of contact through which a line tangent to said roller extends at an acute angle to a line through said point and extending tangent to the path transversed by a point on said pawl during said movement of said arm about the axis of said ratchet whereby to prevent overthrow of said ratchet.

4. In an intermittent drive mechanism having a shaft, means rotatably supporting said shaft,
a ratchet carried by said shaft,
said ratchet having a plurality of teeth around the periphery thereof,
an arm movable about the axis of said shaft independently of said shaft,
and a pawl pivotally supported by said arm and engageable with a tooth on said ratchet whereby to drive said ratchet;
stop means for said pawl comprising a stud,
means supporting said stud in fixed position,
and a roller rotatably mounted on said stud for arresting said pawl.

References Cited by the Examiner

UNITED STATES PATENTS

| | | | |
|---|---|---|---|
| 2,171,044 | 8/39 | Nelsen et al. | 74—142 |
| 2,323,840 | 7/43 | Obszarny | 74—142 |
| 2,487,733 | 11/49 | Scheffer | 74—527 |
| 2,488,766 | 11/49 | De Moss | 74—142 |
| 3,097,278 | 7/63 | Alderman | 74—126 X |

BROUGHTON G. DURHAM, *Primary Examiner.*